United States Patent
Dudar et al.

[11] Patent Number: 5,936,240
[45] Date of Patent: Aug. 10, 1999

[54] MOBILE AUTONOMOUS ROBOTIC APPARATUS FOR RADIOLOGIC CHARACTERIZATION

[75] Inventors: Aed M. Dudar, Dearborn, Mich.; Clyde R. Ward; Joel D. Jones, both of Aiken, S.C.; William R. Mallet, Cowichan Bay, Canada; Larry J. Harpring, North Augusta; Montenius X. Collins, Blackville, both of S.C.; Erin K. Anderson, Pleasanton, Calif.

[73] Assignee: The United States of America as represented by the United States Department of Energy, Washington, D.C.

[21] Appl. No.: 08/790,923

[22] Filed: Jan. 29, 1997

Related U.S. Application Data

[60] Provisional application No. 60/010,851, Jan. 30, 1996.

[51] Int. Cl.[6] .................................................. G01V 5/00
[52] U.S. Cl. ............................................. 250/253; 250/367
[58] Field of Search .............................. 250/336.1, 361 R, 250/367, 369, 253

[56] References Cited

U.S. PATENT DOCUMENTS

| 3,008,046 | 11/1961 | Carpenter | 250/253 |
| 5,006,713 | 4/1991 | Miller et al. | 250/361 R |
| 5,286,973 | 2/1994 | Westrom et al. | 250/253 |
| 5,324,948 | 6/1994 | Dudar et al. | |

*Primary Examiner*—Constantine Hannaher
*Attorney, Agent, or Firm*—James Durkis; William R. Moser; Paul A. Gottlieb

[57] ABSTRACT

A mobile robotic system that conducts radiological surveys to map alpha, beta, and gamma radiation on surfaces in relatively level open areas or areas containing obstacles such as stored containers or hallways, equipment, walls and support columns. The invention incorporates improved radiation monitoring methods using multiple scintillation detectors, the use of laser scanners for maneuvering in open areas, ultrasound pulse generators and receptors for collision avoidance in limited space areas or hallways, methods to trigger visible alarms when radiation is detected, and methods to transmit location data for real-time reporting and mapping of radiation locations on computer monitors at a host station. A multitude of high performance scintillation detectors detect radiation while the on-board system controls the direction and speed of the robot due to pre-programmed paths. The operators may revise the preselected movements of the robotic system by ethernet communications to remonitor areas of radiation or to avoid walls, columns, equipment, or containers. The robotic system is capable of floor survey speeds of from ½-inch per second up to about 30 inches per second, while the on-board processor collects, stores, and transmits information for real-time mapping of radiation intensity and the locations of the radiation for real-time display on computer monitors at a central command console.

20 Claims, 4 Drawing Sheets

MOBILE AUTONOMOUS ROBOTIC APPARATUS FOR RADIOLOGIC CHARACTERIZATION

CROSS REFERENCE

This application claims the benefit of U.S. Provisional Application No. 60/010,851, filed Jan. 30, 1996, titled "Highly-Autonomous Maintenance-Free Characterization Robot."

DISCLOSURE

The United States Government has rights in this invention pursuant to Contract No. DE-AC09-89-SR18035 between the U.S. Department of Energy and Westinghouse Savannah River Company.

BACKGROUND OF THE INVENTION

1. Field of the Invention

The invention relates to remote radiation surveying of relatively level surfaces by an autonomous robotic system incorporating radiation detectors, laser assisted navigation, ultrasound obstacle avoidance, real-time transmission of radiation readings and locations, and visual alarm displays for notification of the detection of radiation.

2. Description of the Prior Art

Radiological surveys of areas contaminated with radiation, or chemical surveys of areas contaminated with toxic chemicals, are historically done by workers who manually transport and operate instrumentation for sensing radiation or toxic chemicals from point-to-point within a contaminated area, therefore providing a potential for worker exposure as data is acquired.

The invention is an improvement to the mobile robot for radiological surveys described in U.S. Pat. No. 5,324,948 to Dudar et al., which is incorporated by reference. Dudar discloses a robot system equipped with two gas-proportional detectors for radiological surveys which interface with a radiation analysis instrument. The gas-proportional detectors are sensitive to alpha, beta-gamma, or other radiation such as neutron or gamma-only radiation. The gas-proportioned detectors require a constant purge of gas for operation. The Dudar robot system must carry two gas cylinders at all times, which add to the weight of the robot system and require time for purging of the gas lines when the gas cylinders are changed. The Dudar robot system has an obstacle avoidance system that limits the operation of the robot to structured areas, and the robot does not function adequately in open unstructured areas such as large interior storage buildings.

SUMMARY OF THE INVENTION

It is thus an object of this invention to provide an apparatus that functions as a mobile robotic platform that is able to perform radiological surveys of surfaces in relatively flat areas in an autonomous manner. The robot is called MACS (Mobile Automated Characterization System) and it is an improved version of a similar mobile robot for which the U.S. Pat. No. 5,324,948 (Dudar et al.), issued on Jun. 28, 1994 and incorporated herein by reference.

It is a further object of this invention that the MACS robot platform contains major advantages over the prior art, significantly the ability to monitor for alpha and beta/gamma radiation while simultaneously issuing visual alarms concerning the location of the radiation. The MACS robot platform utilizes a first detection unit to transmit and receive ultrasound pulses and a second detection unit to transmit and receive laser light to detect upcoming obstacles in the path of the robot, to maneuver around the obstacles, and to return the robot platform to a predetermined path across the surface undergoing survey for radiation.

The MACS robot platform contains further major advantages over the prior art in that the radiation detectors utilized are a plurality of scintillation detectors, which detect the presence of radiation by phosphorescence. The MACS robot platform contains the computer hardware, software, and equipment for activating visual alarms attached to the robotic platform when radiation is detected above a preselected threshold. The MACS contains the means to stop after detecting radiation, back-up, and re-monitor the locations where radiation is detected, before continuing on the platform's preselected pathway.

The MACS robot platform contains further major advantages in that the robot is able to communicate to a centrally located operator control console by ethernet transmissions, allowing for further autonomous operations. The MACS robot platform has the computer hardware and software to allow voice synthesizer equipment to issue verbal warnings when radiation is detected. The MACS robot platform has an on-board computer system that is able to control the operation of the different functions of the robot platform, to store radiation data and locations, and to transmit by ethernet the stored data for the locations of radiation detected on the surfaces navigated by the robot. The radiation location information transmitted by the MACS is in a software format named RADMAP which allows real-time mapping of the locations and intensity of the radiation detected.

DESCRIPTION OF THE PREFERRED EMBODIMENT

The MACS robotic platform is a commercially available, independently mobile robot such as the NavMaster (K2A) platform made by Cybermotion, Inc. (Roanoke, Va.). The base platform is radio-controlled and can navigate autonomously by laser scanner feedback from objects, by ethernet communications of path corrections, and by counting the platforms wheel revolutions, a method known as dead reckoning. The drive unit comprises an electric battery powered electric motor, which drives a series of gears and a rotary camshaft which are connected to the three wheels. A ultrasound pulse unit includes emitters and receivers on the platform's front, sides, and rear, and provides collision avoidance capabilities for hallways and paths between stored containers. The laser LIDAR (Light Distance and Ranging) unit provides the capability to correct the robot's position and azimuth while navigating in open unstructured environments. The mobile platform is capable of following preselected paths that are downloaded to the on-board processor from a host computer. The mobile platform carries electric rechargeable batteries and carries an automatic docking system for connection to the central command module.

The MACS robotic platform has the ability to transverse open areas at speeds of from ½-inch per second up to 30 inches per second, while monitoring the surface for radiation contamination, issuing audible alarms when contamination over preselected levels is detected, and providing location data of the contamination for real-time mapping of the intensity of the radiation over a large open area.

The MACS robot system includes an onboard Versa Module Europe (VME) computer rack with Motorola processor boards which integrate the platform's movement with the radiation monitors. The Motorola processor boards (PC-425) perform tasks such as: data collection in real-time, coordinating the movement of the platform with the preselected mapping pattern for the area, turning on-off detectors, halting vehicle when true radiation alarm took place, and differentiating between true/false radiation alarms, and guiding the robot to the docking station. It is the functionality of the VME and PC-425 based computer processor which make MACS an autonomous surveying robot.

Another improvement is the type of detectors that the robot platform uses for scanning. The MACS uses six scintillation-type detectors such as manufactured by National Nuclear Corporation, which are as sensitive as gas-proportional detectors, but do not require the gas flow or the gas bottles on the platform. Thus, the surveying robot has become maintenance-free in the sense that no routine inspections or replacements of the scintillation detectors are required. MACS can operate immediately once power is turned on. The scintillation detectors are fail-safe by nature and MACS automatically stops when they fail.

MACS uses an on-board computer processor (PC-425) to integrate the mobile robotic base with the scintillation detector hardware. MACS surveys floors at a speed of one-inch per second and stops upon encountering a spot or area of radiation and issues an alarm. MACS backs up and resurveys the spot that triggered the alarm to ascertain whether the alarm was genuine or a spurious one. The vehicle stops in the former case and flashes a strobe light, or the robot resumes its mission in the latter case. While monitoring for radiation alarms, MACS also collects radiation and position data and transmits the information back to the host station in real-time. This data can be displayed and overlaid on a floor plan of the facility being surveyed using a software package called RADMAP.

The robotic monitoring of radiation includes a real-time interface with a software program named RADMAP, which when operated in conjunction with the six scintillation detectors provides a significant improvement over the prior art. RADMAP allows for real-time monitoring of radiation data on the computer screen to visualize the areas of radiation contamination, plus data storage and archiving, and can provide a printed radiation map from a printer associated with the operator control console. The MACS robotic system is capable of collecting radiation data and issuing radiation alarms simultaneously while transversing the area of investigation.

The invention includes an obstacle detection and avoidance system which allows the robot platform to navigate in open unstructured areas, areas with columns and partitions, or along corridors and hallways. The obstacle detection feature utilizes ultrasound pulse emitters and receivers that are part of the robot platform that is manufactured by Cybermotion, Inc. (Roanoke, Va.). The obstacle detection and navigation system utilizes a laser scanner on the top of the platform, named LIDAR (Light Distance and Ranging). The LIDAR Scanner is manufactured by Cybermotion, Inc. (Roanoke, Va.), with hardware manufactured by HelpMate, Inc. (Danbury, Conn.). The laser scanner is interfaced with the guidance mechanism for the robot platform. The laser scanner detects reflections of laser light from reflective targets (fiducial targets) in the area where the robot is navigating. The reflections from the fiducial targets allow the on-board computer to calculate path corrections, to avoid obstacles, and to report the robot's position and heading in relation to the locations of radiation detected. Thus, the robot is capable of navigating in both structured as well as open unstructured environments, which is not found in the prior art.

Preferred Embodiment of the Platform Assembly

The mobile robotic platform provides the capacity to monitor floor surfaces for radiation such as alpha, beta-gamma, gamma-only, and neutron emissions, with issuance of audible alarms when contamination is detected, while transversing a preprogrammed path through an area with avoidance of structures in the path. The robotic detection system can provide real-time reporting of radiation intensity and location for visual portrayal of maps and/or printed maps of areas investigated.

Figure 3:
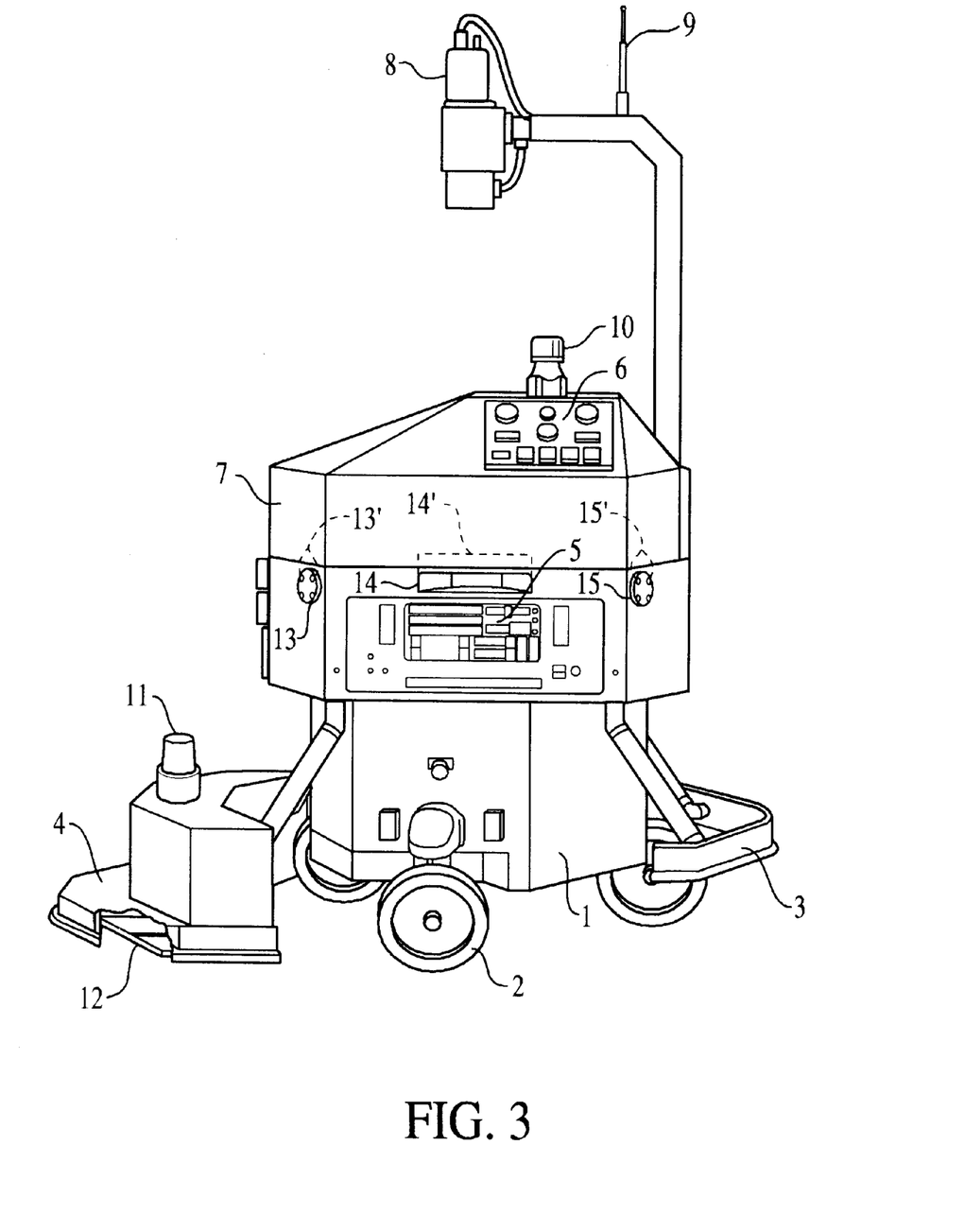
FIG. 3 depicts a diagram of the side view of the MACS robot platform which depicts the front radiation sensors and cover, the three wheels, the rear bumper, the VME (Versa Module Europe) computer board manufactured by Motorola, Inc., a multitude of expansion slots, the on-board status and manual control keys, the two visual alarm lights, the ultrasound pulse emitters and receivers, the laser LIDAR unit, and the ethernet antenna.

Referring to FIG. 3, the mobile robotic platform incorporates a commercially-available three-wheeled unit depicted at 1, such as the K2A Navmaster, a semi-intelligent mobile robot made by Cybermotion of Roanoke, Va. The mobile unit is powered by a rechargeable 24-volt DC battery, has three wheels depicted at 2, and weighs approximately 300 pounds. The three wheels are synchro-driven and turn in unison and trace parallel paths. The mobile unit can navigate autonomously by counting the unit's wheel revolutions for computation of speed and distance covered. The mobile platform has a zero turning radius and is capable of adequate traction on flat or slightly sloping surfaces. The platform has a rear bumper depicted at 3, and a front frame assembly depicted at 4, which serves as a front bumper and covers the radiation detectors. The mobile robot, such as available from Cybermotion, operates at speeds from ½ inch per second up to about 30 inches per second. An optimal speed for detection of radiation on surfaces is about one inch per second.

The robotic platform has slots depicted at 5, for docking and adding expansion cards for the VME on-board computer. The upper part of the robot platform has a control panel depicted at 6, for visual status lights and on/off/reset buttons for an operator to override the guidance system. The platform has a central structure depicted at 7, that houses an adequately sized interior compartment for installation of the on-board VME and PC-425 computer processors. The scintillation radiation detectors are located in the front of the robot platform, underneath the front frame assembly depicted at 4. The LIDAR laser is located on the arm depicted at 8, above the platform. The ethernet antenna depicted at 9, provides for communications with the central command console depicted in FIG. 1. The robot platform has two light-emitting alarm lights, depicted at 10, on top of the platform, and at 11, on top of the front frame assembly. The alarms are activated when the radiation detectors depicted at 12, located under the front frame assembly, detect radiation. The robot platform as manufactured by Cybermotion includes six ultrasound pulse emitters and detectors depicted at 13 through 15 for one side of the platform, and 13' through 15', located on the other side of the platform and provided obstacle avoidance and narrow path navigation capabilities.

The preferred embodiment of the mobile platform for the MACS robot may include any suitable combination of alternative mobile platforms that can provide similar configurations for the equipment required to equal the MACS robot's radiation detection, navigation autonomy, and obstacle avoidance capabilities.

Figure 4:
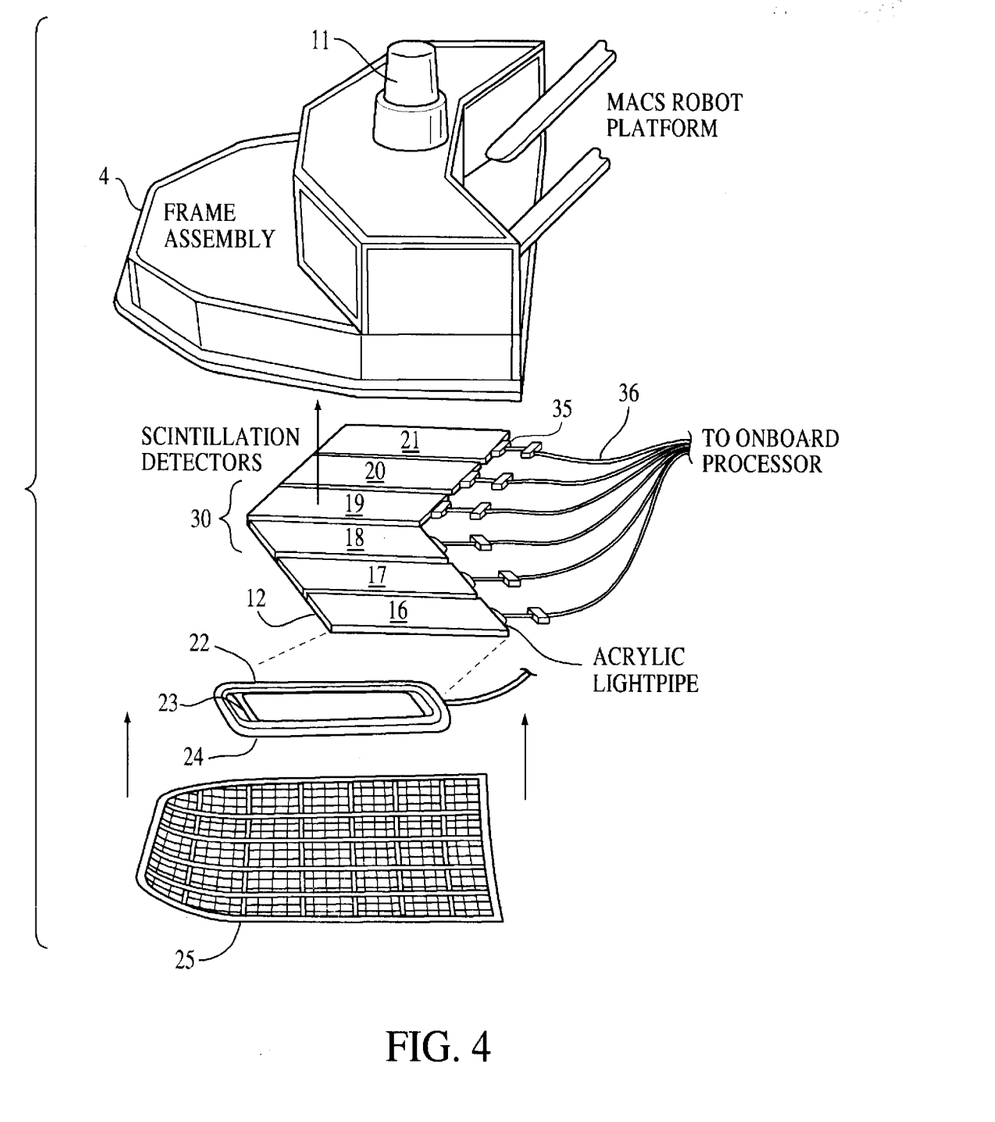
FIG. 4 depicts a diagram of the configuration of the six scintillation detectors in the front frame assembly and the direction of normal progress by the robot platform.

The preferred embodiment of the radiation detectors for the platform includes scintillation detectors, depicted at 12 in FIG. 4, utilizing phosphorescence for radiation detection, with six scintillation detectors located under the front sensor cover and placed as close to the surface under investigation as physically possible, depicted as 12 in FIG. 3. The six detectors are configured in a chevron shape, having a point 30, depicted in FIG. 4, the chevron located in front of the MACS robot platform and under the front sensor cover, the point 30 facing away from the MACS platform, with each detector 16–21 providing detection for one sixth of the footpath covered by the MACS platform. The detectors, when positioned six abreast, span the full width of the frontal area of MACS, approximately 33.2 inches abreast. The plurality of scintillation detectors provide a significant benefit over larger single or dual detectors by providing comparison of the intensity of phosphorescence readings over six detectors which allow separate evaluation of small points of surface radiation that are intense, but close together. The small but intense radiation would be averaged out as weaker sources of radiation over a broader surface area if larger but fewer radiation detectors were utilized as in the prior art. The six detectors are enclosed to protect from contact with walls and obstacles by the addition of a detector shield which encloses the detectors. The scintillator detectors consist of a very thin plastic cover 22 over the plastic scintillant material utilized for detecting alpha and beta/gamma radiation emissions. Each scintillator unit is coupled to an acrylic light pipe which provides electrical connections to the on-board computer processor.

The face of the plastic scintillant has an alpha radiation detector 23 consisting of ZnS scintillant permanently bonded to the face of the plastic scintillant material. The detector assembly is then covered with aluminized polycarbonate, indicated at 24 in FIG. 4, to make each detector assembly light-tight. The detectors are located underneath a cover and frame assembly 4 in front of the robot platform. All surfaces except the downward facing entrance window of each detector are wrapped with additional adhesive material to provide a rugged assembly. The unique construction allows the detectors to be mounted with minimum dead area between adjacent detectors. The six unit detector assembly, exclusive of the photomultiplier tubes, is approximately 33.2 inches wide.

The downward facing entrance window of each scintillation unit is thin and durable. In order to maximize the detection of alpha radiation, a very thin entrance window is required. The detector assemblies are covered by a sturdy protective screen 25 and the assemblies are spaced back from the screen approximately ⅛". The screen is supported every few inches to minimize bowing of the screen into the detectors.

The use of a very thin plastic scintillator provides a detector which performs comparably with Dudar's gas flow proportional detectors, but has several advantages over the Dudar invention. An important feature of the scintillator detectors is the detectors have excellent portability because gas cylinders for the gas flow detectors are not required on the robot platform. The scintillator detectors are rugged and maintainable. The frame assembly for the scintillator detectors provides for height adjustment, but the actual mechanism to adjust the height of the frame assembly is part of the robot platform. The assembly provides attachment points so that it can be mounted to the front bumper of the MACS (FIG. 3).

Each detector is custom machined to the required shape. For the MACS robot each of the three detectors on either side of the centerline are identical and interchangeable, but will not be interchangeable with those on the other side of the centerline. When the six detectors are assembled, the six form a chevron shape as shown in FIG. 4.

The radiation monitoring system for radiation surface detection is controlled by a VME computer bus rack and a PC-425 on-board computer processor. Each scintillation detector is serviced by an independent microcomputer processor shown schematically, for example, in FIG. 4 as communicating processor 35 for scintillation detector 21, manufactured by National Nuclear Corporation (Sunnyvale, Calif.). Each interface board is connected together by an internal RS-232 communications link, shown, for example, at 36 in FIG. 4, with the VME and PC-425 on-board supervisory computer processor. The VME and PC-425 computer processor controls the coordination of the microcomputer with the radiation detectors, providing automatic monitoring of alpha, beta-gamma, gamma-only, and neutron radiation contamination on surfaces assayed by the scintillation detectors. The robot platform movement is controlled by the VME and PC-425 computer processor that coordinates the motion of the robot for resurvey of locations with detected radiation, stores in the processor's memory information on types of radiation detected, stores in memory the locations of the radiation in relation to coordinates triangulated by laser reflections from fiducials located in the area of survey, and reports by ethernet communications the locations of the radiation detected.

Radiation Mapping

A software program developed by the Savannah River Technology Center interprets the radiation data gathered by the scintillation detectors and provides visual displays of the data. The Mobile Robot Radiation Mapping, or RADMAP, provides the MACS robot with the ability to display real-time radiation mapping for floor areas on a central computer screen for data storage and archiving, and for real-time printing of maps of floor contamination.

Figure 1:
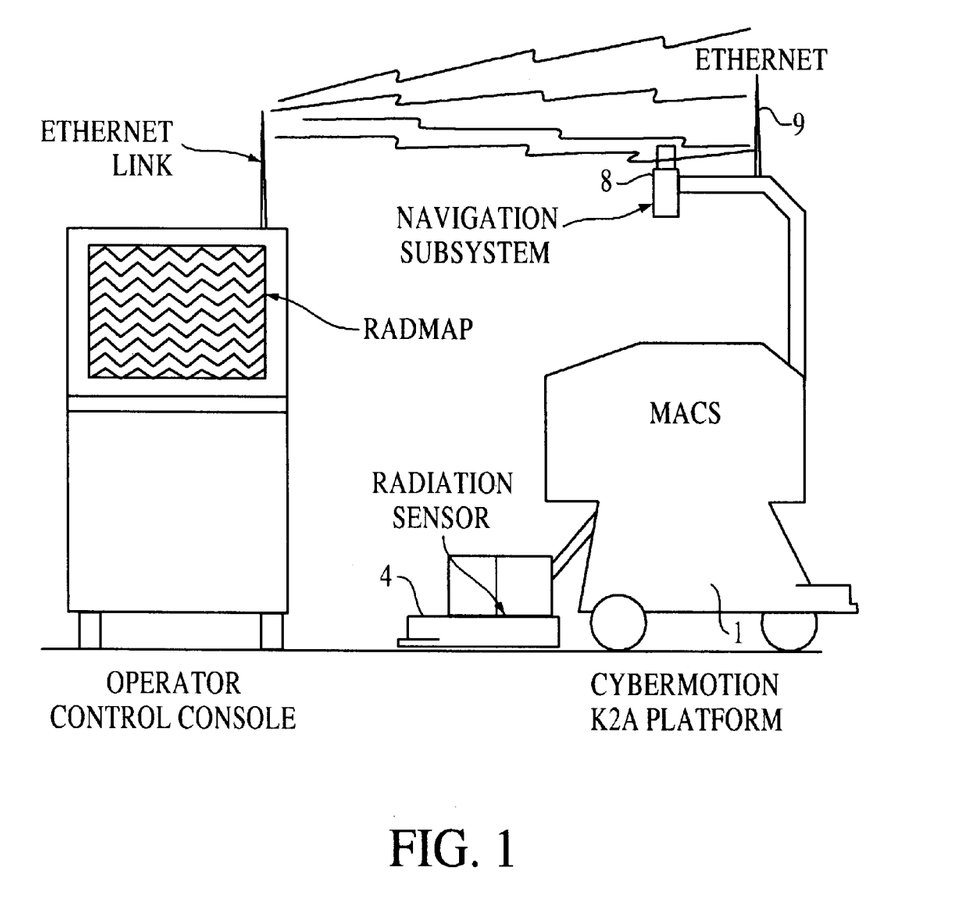
FIG. 1 depicts a schematic of the mobile robotic K2A platform named MACS (Mobile Automated Characterization System), and the operator control console.
Figure 2:
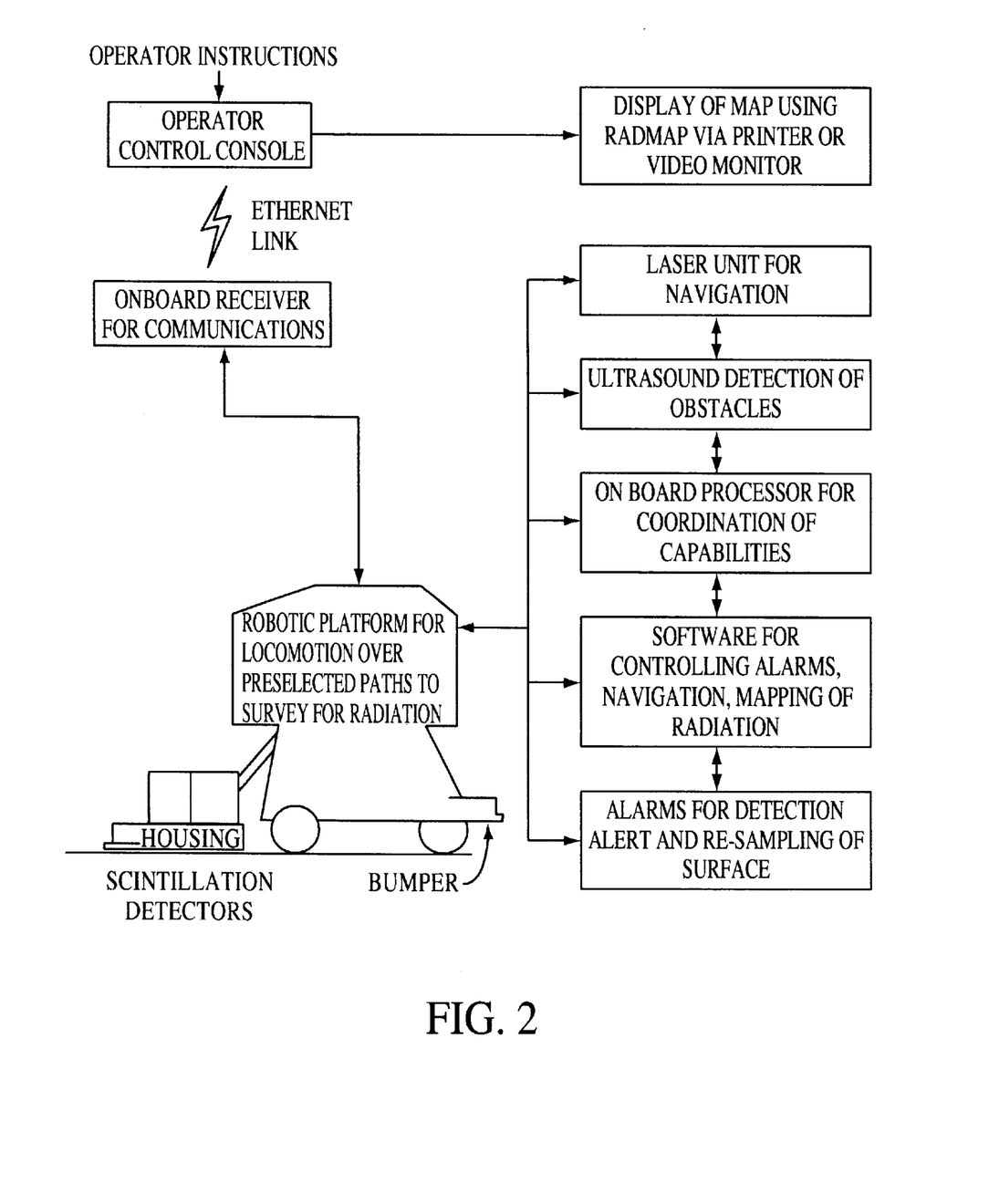
FIG. 2 depicts a diagram of the MACS robot communications system between the radiation detectors, the ultrasound unit and the laser unit, the radiation mapping system, and the computer processor and software integration systems.

The RADMAP software is stored in the host computer with radiation data and location coordinates stored in the on-board VME and PC-425 computer processor before transmission by ethernet communications (FIG. 2). The mapping calculations are computed by the host computer in the operator control console (FIG. 1). The MACS robot detector assembly is able to collect radiation data, identify the position of each data point, issue light alarms when each radioactive point is encountered, and transmit real-time cumulative data for a floor area for generation of updated maps of the area surveyed at a central operator control computer screen and printer. The data displayed by RADMAP is in an easily understood format such as a floor-plan map with the types of radiation (alpha, beta, gamma, and neutron emitters), and the extent of radioactive contamination displayed.

The Robot Platform Interface with a Operator Control Console

The MACS robot provides computer connections and ethernet radio interface for programming of predefined paths across open areas, which is downloaded from the host computer when MACS is connected to the operator control console. The MACS also has the improvement of an operator interface keyboard on top of the robot platform. The interface keyboard allows users to key in commands and corrections to the previously downloaded monitoring path, while the MACS is transversing an area under surveillance.

The Laser Guidance and Ultrasound Avoidance Units

The MACS robot incorporates a laser scanner called the LIDAR (Light Distance and Ranging), manufactured by Cybermotion, Inc. (Roanoke, Va.), with hardware from HelpMate, Inc. (Danbury, Conn.). LIDAR is utilized by the MACS for navigation in open unstructured areas and for obstacle avoidance in structured areas. The laser light unit is located on top of the robot on a metal appendage or arm that rises above the robot platform. The LIDAR unit receives reflected laser light from nearby obstacles, far walls, and from fiducial landmarks such as retroreflective light poles positioned at known locations in the area of survey, which allows the robot to triangulate using the fiducial landmarks to navigate through an area on a predetermined and programmed path. The laser scanner provides location information for the software and hardware of the on-board guidance mechanism to control the robot platform. The robot is capable of navigating through an area while undergoing radiation scanning by the on-board scintillation detectors, in either open areas or areas with structures that obstruct the scanning pathway.

The MACS platform also carries six ultrasonic detection devices to detect obstacles within a few feet of the platform and to allow the robot to follow along walls or corridors between containers. The ability to constantly monitor the platform's pathway through an area for containers, walls, and other obstacles, plus the use of laser light reflections to measure distances and the progress of the platform over a preselected path, and the capability to avoid and maneuver around obstacles in the scanning pathway, is a unique combination of features when coordinated with the radiation detection capabilities of the scintillation detectors.

The above description is given in reference to preferred embodiments. However, it is understood that many variations are apparent to one of ordinary skill in the art from a reading of the above specification and such variations are within the spirit and scope of the instant invention as defined by the following appended claims.

What is claimed is:

1. An apparatus for performing characterization of radioactive contamination on surfaces at a location within an area, said apparatus measuring the intensity of surface radiation and the location of said surface radiation, said apparatus comprising:

a platform;

a drive unit providing locomotion of said platform;

a first detection unit carried by said platform for locating obstacles in a path of said platform;

a second detection unit carried by said platform for navigating said platform in a preselected path over a surface;

a plurality of radiation detectors carried by said platform;

a processor controlling movement of said platform carried by said platform; and a communications device carried by said platform for remotely communicating the intensity of surface radiation and the location of surface radiation at each time of detection by the plurality of radiation detectors.

2. The platform as recited in claim 1 wherein said drive unit providing locomotion comprises:

a motor;

a battery power source for the motor;

a means for transferring motion from said motor, said means controlled by said processor;

at least two wheels connected to the means for transferring motion for movement of said platform over areas of approximately level surfaces;

a third wheel providing stability for said platform; and said third wheel providing maneuverability over said areas for said platform.

3. The platform as recited in claim 1 wherein said first detection unit for locating obstacles in the path of said platform further comprises:

a plurality of ultrasound pulse emitters located on the front, side, and rear of said platform;

a plurality of ultrasound pulse receivers located on the front, side, and rear of said platform;

said processor directing said emitters to generate ultrasound pulses from said emitters; and said processor receiving ultrasound pulse detection signals indicative of obstacles from said receivers.

4. The first detection unit for locating obstacles as recited in claim 3 wherein said processor further performs the steps of:

interpreting said ultrasound pulse detection signals;

controlling the movement of said platform to avoid said obstacles; and directing the movement of said platform to a pre-selected path over the area to be mapped for radiation.

5. The platform as recited in claim 1 wherein said second detection unit for navigating said platform further comprises:

a light unit producing laser light pulses;

a light unit receiving laser light pulses reflected off of obstacles;

said processor interpreting the reflected light data from obstacles in the path of the platform;

said processor directing the movement of the platform to avoid said obstacles; and said processor directing the return of said platform to said preselected path.

6. The platform as in claim 1, wherein said plurality of radiation detectors carried by said platform further comprises:

said detectors comprising scintillation detectors;

a detection face located on each of said scintillation detectors, said detection face pointing downward;

said plurality of detectors located in front of the platform close to the surface, said plurality of detectors assembled side by side in the shape of a chevron, a point of said chevron leading the platform;

said plurality of detectors attached underneath a single frame assembly in front of the platform; and said single frame assembly attached to an adjusting mechanism to lower or raise the single frame assembly.

7. The plurality of radiation detectors as recited in claim 6, wherein each detector further comprises:

a component of plastic separately enclosing each scintillation detector with a window oriented down toward said surface, with the window transparent to radiation;

said scintillation detector containing a radiation detector constructed of zinc sulfide, said zinc sulfide detector being bonded to said detection face, said detection face being located in front of said platform close to said surface to point down toward said surface;

a light-tight cover covering said scintillation detector; and an independent microcomputer processor communicating information from said scintillation detector to the on-board processor.

8. The plurality of radiation detectors as recited in claim 7, wherein each detector is assembled side by side in the single frame assembly, further comprising a removable protective screen for the downward pointing faces of the detectors.

9. The platform as cited in claim 1, wherein said communications device carried by said platform for remotely communicating the location of radiation detected further performs the steps of:

communicating by radio transmissions with a central data collection station;

communicating by radio transmission the type of radiation detected as the radiation is detected;

communicating by radio transmission the location of the radiation detected as the location is detected;

communicating by radio transmission the intensity of radiation detected over a preselected level of radiation as the intensity is detected; and communicating by radio transmission a format for mapping of said location of all radiation detected.

10. The communications device as recited in claim 9 for communicating the location of radiation detected further performing the step of communicating by ethernet frequency to and from the central data collection station, at each time of detection of the radiation.

11. The platform as recited in claim 1, wherein said processor for controlling movement carried by said platform controls the repetitive monitoring for radiation and further comprises:

a first set of instructions for halting the forward progress of said platform when radiation is detected over a preselected limit at a location;

a second set of instructions for requiring the platform to back up to said location of detected radiation;

a third set of instructions for controlling the platform in a stationary mode over the location of detected radiation; and a fourth set of instructions for resuming the platform locomotion to a preselected direction and speed over the surface.

12. The processor for controlling movement as recited in claim 11, wherein said processor further comprises a set of instructions for operation of the radiation detectors for repetitive radiation detection during the time that said platform is stationary.

13. The processor for controlling movement as recited in claim 11, wherein said processor further comprises a set of instructions for operation of a plurality of alarm lights during the detection of radiation by said detectors and while said platform is stationary.

14. The processor for controlling movement as recited in claim 11, wherein said locomotion over said preselected path is at variable speeds of from about one-half inch per second to about thirty inches per second.

15. An apparatus for performing characterization of radioactive contamination on surfaces within an area, said apparatus measuring the intensity of surface radiation and the location of said surface radiation, said apparatus comprising:

a platform;

a drive unit of said platform;

a plurality of scintillation detectors carried by said platform;

a plurality of alarms for alerts upon detection of surface radiation over a preselected limit;

a processor controlling said scintillation detectors and alarms; and a communications device carried by said platform for remotely communicating the type of surface radiation, the intensity of surface radiation, and the location of surface radiation at each time of detection by the plurality of scintillation detectors.

16. The platform as recited in claim 15 wherein the plurality of scintillation detectors further comprises:

a frame assembly, said frame assembly enclosing said plurality of scintillation detectors;

said plurality of scintillation detectors located in front of the platform close to the surface and assembled side by side in the shape of a chevron with a point of said chevron leading the platform;

said plurality of scintillation detectors attaching to said frame assembly in front of the platform; and an adjusting mechanism to lower or raise said frame assembly connected to the front of the platform.

17. The platform as recited in claim 15 wherein the plurality of alarms for alerts further comprises:

an alarm light located on top of the platform;

an alarm light located on top of said frame assembly;

said processor carried by the platform for generating an alarm signal to the alarm lights; and said processor generating alarm signals to the alarm lights when said plurality of scintillation detectors detect radiation over a preselected limit.

18. The platform as recited in claim 17 wherein said processor generating said alarm signal further provides the continued generation of said alarm signal during the detection of radiation on said surface by said plurality of scintillation detectors.

19. The platform as recited in claim 17 wherein said processor generating said alarm signal further generates a signal to end said alarm signal when the platform resumes forward movement.

20. The platform as recited in claim 15, wherein said processor for controlling the detectors and alarms further comprises:

an on-board computer receiving electrical signals when said plurality of scintillation detectors detect a location of radiation on said surface of the area;

said on-board computer generating a set of instructions for controlling the platform movement to back-up to said location of radiation on said surface;

said on-board computer generating a second set of instructions for triggering an alarm light during monitoring by said plurality of scintillation detectors for a preselected period of time;

said on-board computer generating a third set of instructions for controlling the platform locomotion to return to a pre-selected path over said surface after said preselected period of time; and said on-board computer generating a fourth set of instructions for controlling said plurality of scintillation detectors to resume detection during locomotion over said preselected path.

* * * * *